(12) United States Patent
Ledingham

(10) Patent No.: US 6,516,933 B1
(45) Date of Patent: Feb. 11, 2003

(54) BENDABLE ROLLING CONVEYOR GUIDE

(75) Inventor: Stuart J. Ledingham, Coto de Caza, CA (US)

(73) Assignee: Valu Engineering, Inc., Rancho Santa Margarita, CA (US)

( * ) Notice: Subject to any disclaimer, the term of this patent is extended or adjusted under 35 U.S.C. 154(b) by 0 days.

(21) Appl. No.: 09/706,460

(22) Filed: Nov. 3, 2000

(51) Int. Cl.⁷ ............................................. B65G 13/00
(52) U.S. Cl. .................... 193/35 F; 193/35 R; 193/37; 198/442
(58) Field of Search .............................. 193/35 F, 35 R, 193/37; 198/442

(56) References Cited

U.S. PATENT DOCUMENTS

| | | | | |
|---|---|---|---|---|
| 2,593,089 A | * | 4/1952 | Barry | 193/35 R |
| 2,920,734 A | * | 1/1960 | Heinrich | 193/35 R |
| 3,045,791 A | * | 7/1962 | Ayres | 193/35 R |
| 3,103,271 A | * | 9/1963 | Christiansen, Jr. | 198/35 F |
| 3,934,706 A | | 1/1976 | Tice | |
| 3,954,170 A | * | 5/1976 | Schlough | 198/236 |
| 4,962,843 A | | 10/1990 | Ouellette | |
| 5,143,200 A | | 9/1992 | Fuller | |
| 5,435,427 A | * | 7/1995 | Guiher | 193/35 R |
| 6,079,544 A | * | 6/2000 | Donati et al. | 198/446 |

FOREIGN PATENT DOCUMENTS

EP 0 888 985 A1 1/1999
EP 0 893 373 A1 1/1999

OTHER PUBLICATIONS

New Product Brochure of MAR BETT Conveyor Components describing Part. 580–581 (Snap–on Roller Side Guide)—pp. 1– (Jan. 1998).
New Product Brochure of MAR BETT Conveyor Components describing Part. 578 (Modular Roller Transfer Guide)—pp. 1–2 (Jan. 1998).
Catalog of Conveyor Components, Custom Plastics, Industrial Parts by Valu Guide, Nolu Plastics, Solus Industrial Innovations, vol. 1—pp. 41 (Jul. 2000).
Catalog of Conveyor Components by System Plast—pp. 185,186,189 and 195 (Nov. 1998).

* cited by examiner

*Primary Examiner*—Douglas Hess
(74) *Attorney, Agent, or Firm*—Knobbe, Martens, Olson & Bear LLP

(57) ABSTRACT

A readily bendable rolling conveyor guide is provided. The guide includes axle-positioning members having notches. The axle-positioning members slidably engage channels mounted to a structural support member. A plurality of axles carrying rotatable elements and spacers are disposed between the axle-positioning members. Due to the notches in the axle-positioning members and the unique cross-section of the exterior of the channels, the assembled guide may be bent at small radii without causing distortion of the channels or interference between the axle-positioning members and the channels.

27 Claims, 9 Drawing Sheets

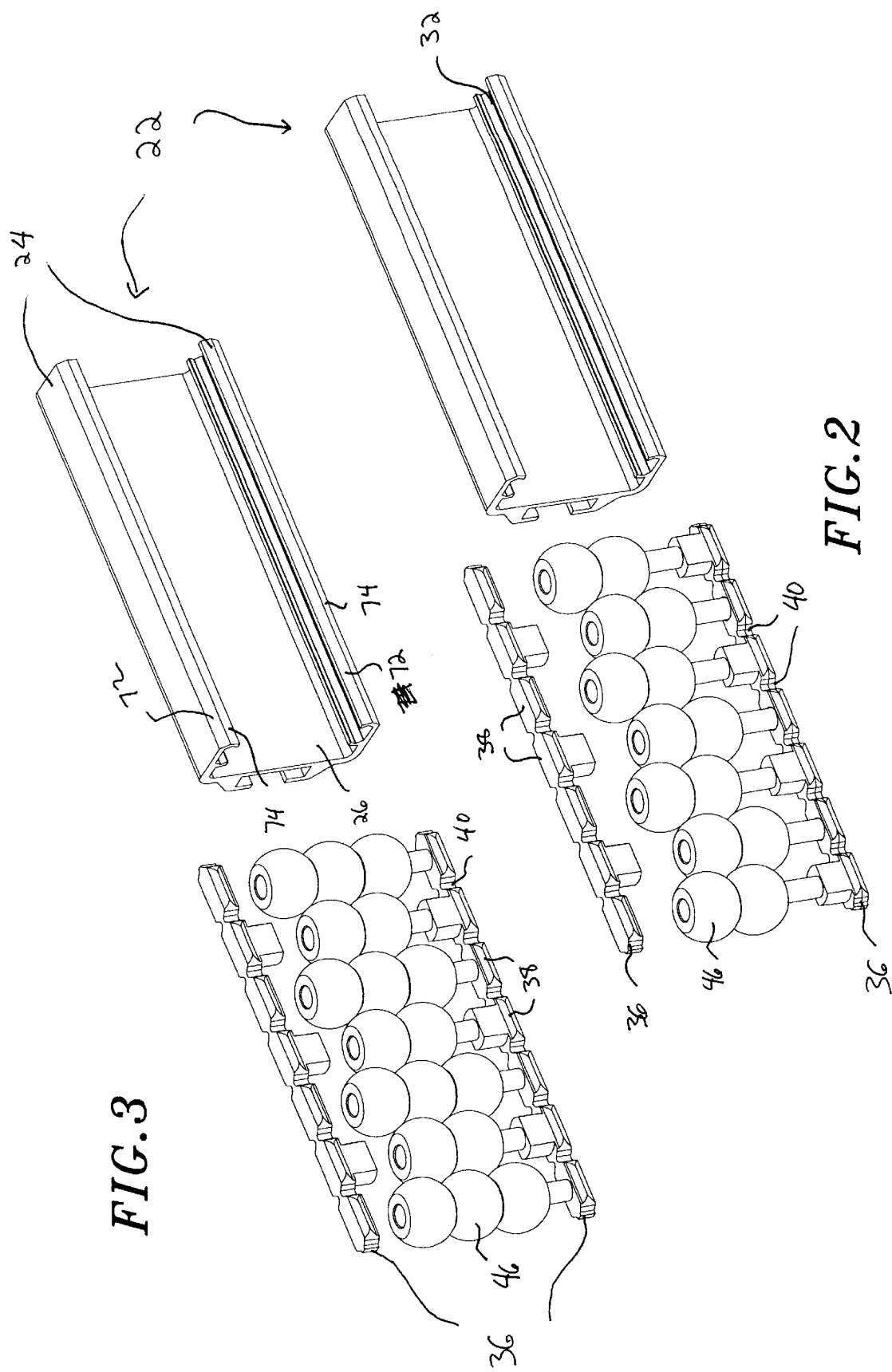

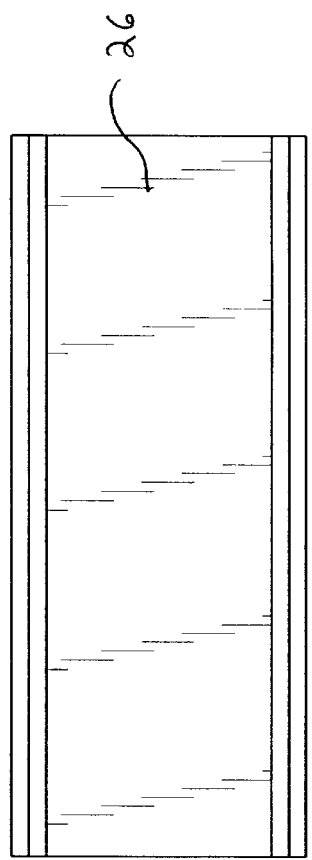
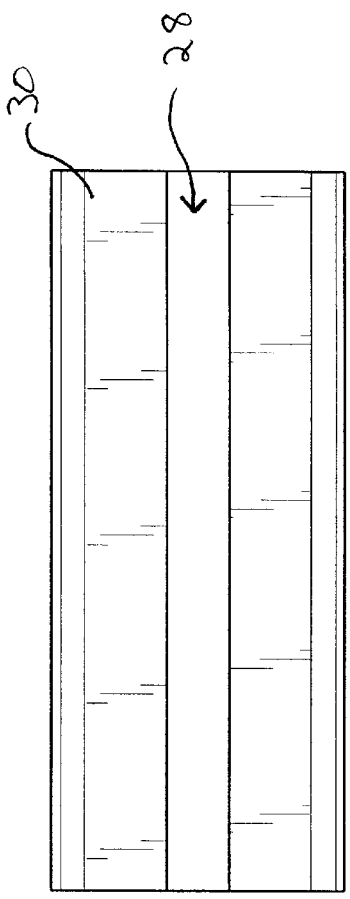
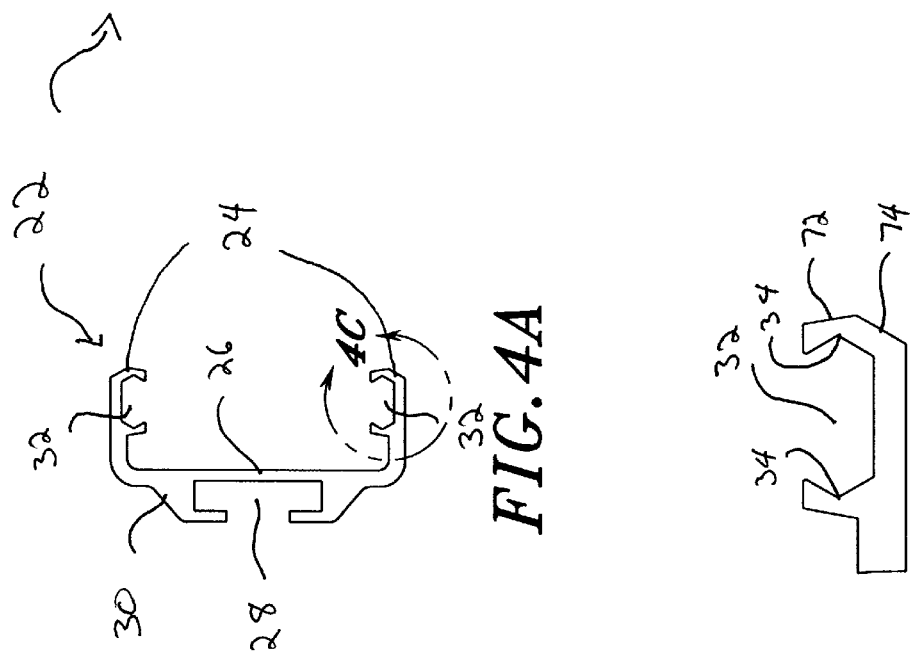
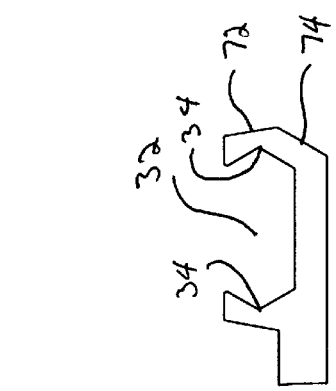

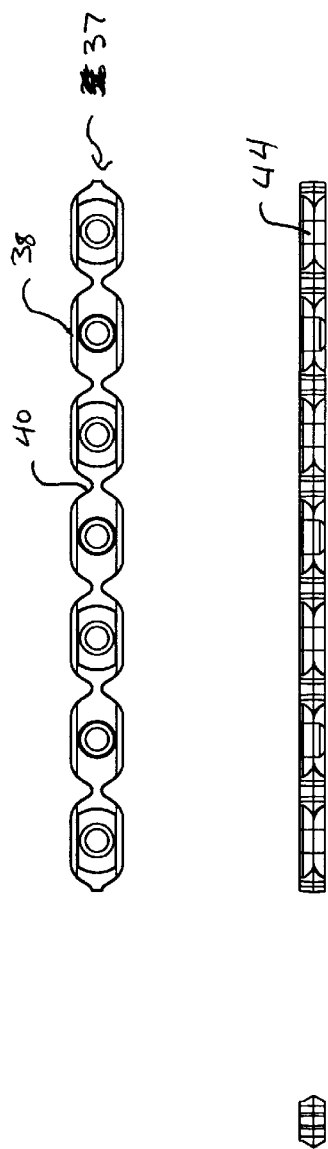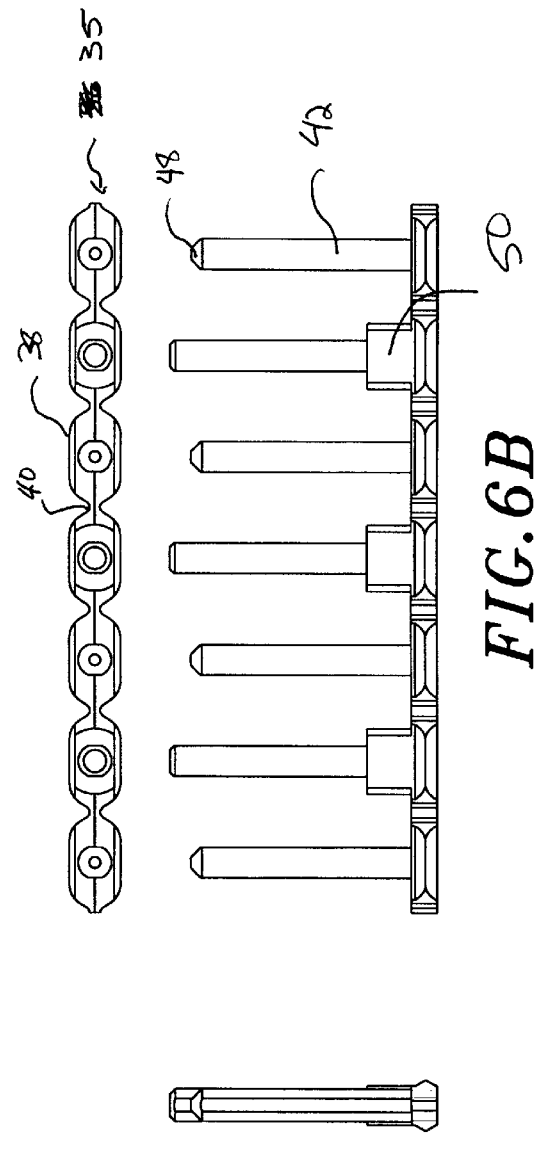
FIG. 6A
FIG. 6B

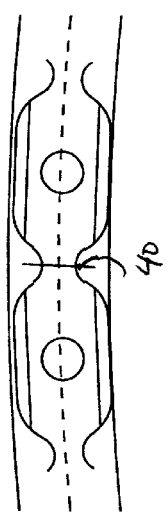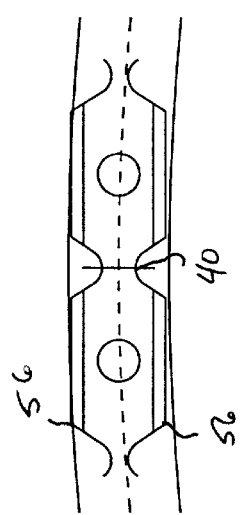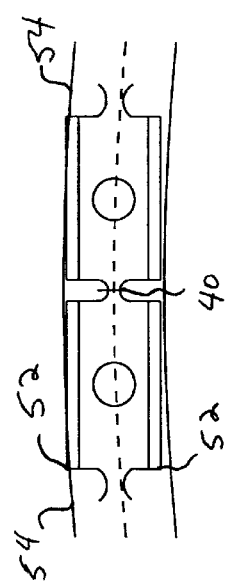

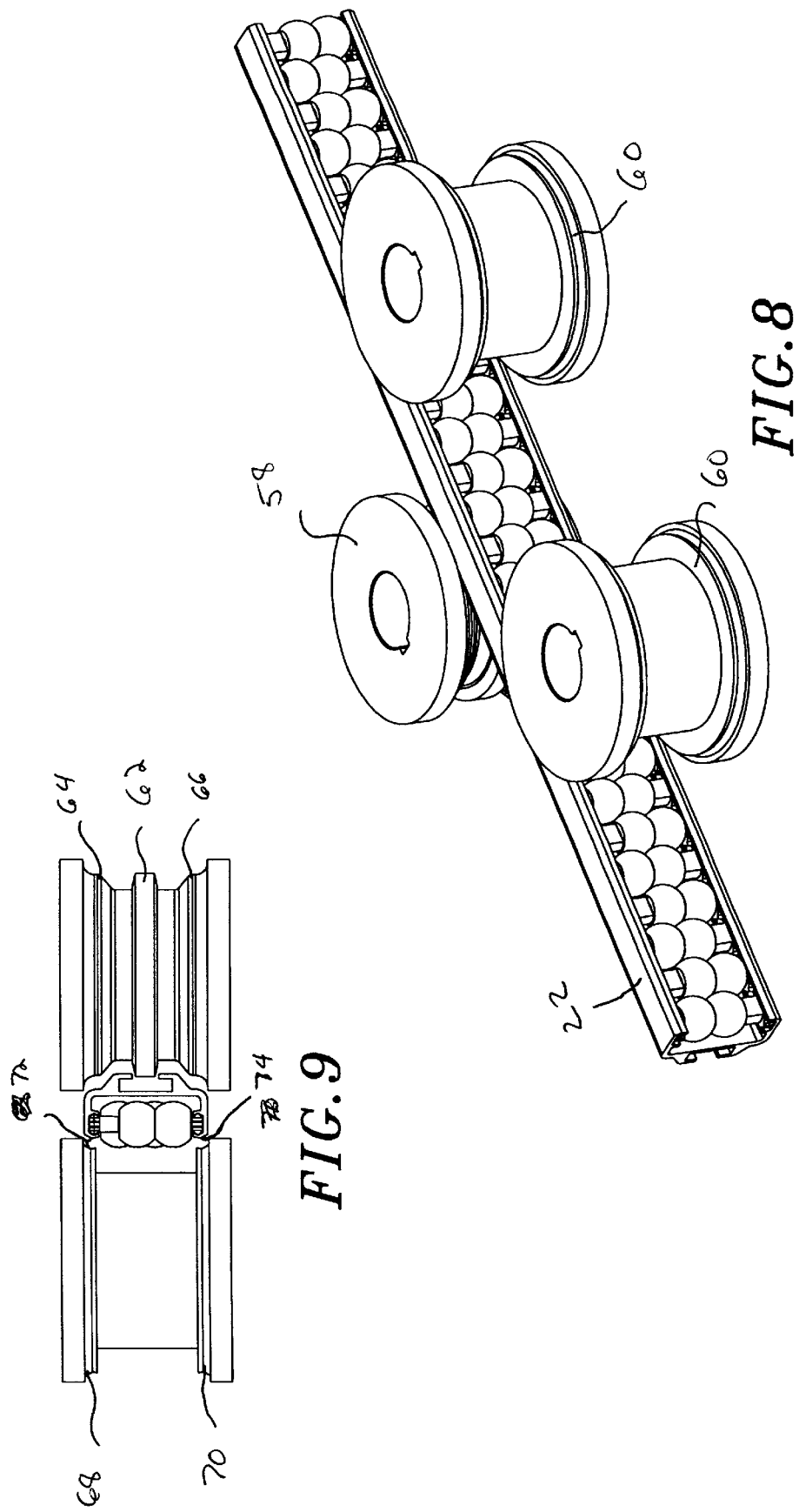

BENDABLE ROLLING CONVEYOR GUIDE

BACKGROUND OF THE INVENTION

1. Field of the Invention

The invention relates to guides for installation on opposite sides of a container transporting conveyor system. More specifically, the invention relates to guides that are adapted for installation along both curved and straight sections of the conveyor system.

2. Description of the Related Art

Guides mounted on opposite sides of conveying systems are used in a variety of places in industrial installations. For example, they are used for combining (channeling a wide procession of conveyed articles in a disorderly array into a single file), forcing articles around bends in the conveying system, or simply preventing articles from falling off the side of the conveyor. Generally, there is at least one guide mounted on each side of the conveyor.

Guides may either be fixed or rolling, depending upon the nature of the guide surface that contacts the conveyed articles. Fixed guides provide a smooth surface for articles to contact, while rolling guides provide rotatable elements mounted upon vertical axles. Guides of both types provide a low friction guiding surface for a large variety of individual containers including glass, metal, plastic and paperboard, and packages like cardboard boxes, and plastic wrapped bundles or trays. Excess friction in any of these applications can cause line stoppage, package jamming and possible damage, product spillage or skewed orientation.

In powered conveyor applications especially, fixed guides generally provide too much friction to be useful, especially when a container or package must be guided around a turn or through a transfer from one conveyor to another. Rolling guides have been found to be an excellent solution to these problems. In some curved sections of conveyors, there is only a rolling guide on one side of the conveyor, with a fixed guide on the other side. Where only one rolling guide is used, the rolling guide is usually mounted on the outside, or larger radius, of the curve.

Rolling guides are often constructed in a similar manner. A rolling member is positioned on a shaft or axle and contacts the product/package surface. Sizes of rolling members, and heights of rolling guides, vary. Guides can be from one inch with one member to ten inches with fifteen-plus members. Rolling members can interlock (nest) or stand adjacent. A dense interlocked pattern is preferred, because the interlocking members minimize gaps that tend to catch passing articles. The axles are in turn connected to a structural supporting member by means of an axle-positioning plastic cap. Aluminum extrusions, bars of steel or aluminum and formed sections of sheet metal are the most common materials for the supporting member.

For economic reasons, guides are generally manufactured in standard lengths. However, applications for guides often require unique bead lengths. Therefore, either each length must be amenable to being cut and/or bent by the purchaser to conform to each application, or the purchaser must special order the specific lengths and radii of guides needed, which is typically a more expensive option.

Examples of rolling guides are shown in U.S. Pat. Nos. 3,934,706, 4,962,843 and 5,143,200, and VALU GUIDE Model #684. Each of these guides generally comprises an upper and a lower frame member that are adapted to be mounted alongside and parallel to the conveyor. U.S. Pat. No. 4,962,843 comprises a plurality of vertically stacked frame members. A plurality of axles are disposed between the frame members, usually with the longitudinal axis of each axle oriented perpendicularly to the conveying surface. Rotatably attached to the axles are beads, which are generally spherical, or rollers, which are generally cylindrical with protruding flanges that are either round or polygonal.

This guide configuration is particularly useful for combining, where each guide is straight. However, none of these guides are easily bent after they have been assembled. Bending these guides often results in radical deformation of the supporting structure and even failure. Therefore, none of these guides are well suited for use in curved sections of a conveying system unless they are custom manufactured to meet a particular customer's need.

Two examples of guides that are more easily bent by the purchaser are the Marbett Model #580 and 581, and the System Plast device. Each length of these guides comprises multiple short sections of frame members that are all flexibly attached to one another by means of plastic hinges. The back side of each section contains a channel that is adapted to be slidably attached to a bent mounting strip. These designs have some major drawbacks, however. First, the minimum bending radii are rather high (approximately 13" for an internal curve, and 15" for an external curve for the Marbett, and approximately 18" for an internal curve, and 24" for an external curve for the System Plast). A plant layout requiring tighter radii would not be able to use these guides. Second, because the device only bends between sections, and each section contains four axles, it does not provide an entirely smooth curve. The transition points between sections have a tendency to catch passing articles on the conveyor, leading to jamming.

The design of all of the above-mentioned guides also makes them more expensive to manufacture. The axles must first be inserted into an axle-positioning member. After the rotatable elements have been installed, every single axle must be lined up properly before the other axle-positioning member can be secured to the other end of the axles. This is a very tedious process that is difficult to automate.

A guide that is easily and cheaply manufactured, easily bent by the purchaser, is capable of being bent to small radii, and that doesn't have a tendency to cause conveyed articles to jam would be of great benefit in any industry that uses conveyors.

SUMMARY OF THE INVENTION

The bendable conveyor guide of this invention has several features, no single one of which is solely responsible for its desirable attributes. Without limiting the scope of this invention as expressed by the claims that follow, its more prominent features will now be discussed briefly. After considering this discussion, and particularly after reading the section entitled "Detailed Description of the Preferred Embodiments," one will understand how the features of this invention provide advantages, which include ease of assembly and ability to be bent by the purchaser.

The invention provides a rolling conveyor guide that is easy to bend, and is thus readily adaptable for use in any conveyor layout. The invention includes any number of axles disposed between a pair of chain-like axle-positioning members. The axles serve as mounting points for rotatable elements such as rollers or beads. The axles and/or spacers may be molded integrally with the axle-positioning members. A structural support member is provided having two channels in which the axle-positioning members slidably engage. The axle-positioning members are rigid but readily bendable due to evenly spaced notches cut in the edges of the axle-positioning member. The shape of the notches ensures that the axle-positioning members will not interfere with the interior walls of the channels when the entire assembly is bent. Theoretical radii as small as 5" may be obtained.

BRIEF DESCRIPTION OF THE PREFERRED EMBODIMENTS

The preferred embodiments of this invention, illustrating its features, will now be discussed in detail. These embodiments depict the novel and non-obvious bendable conveyor guide of this invention shown in the accompanying drawings, which are for illustrative purposes only. These drawings include the following figures, with like numerals indicating like parts:

FIG. 2 is an exploded perspective view of a preferred embodiment of the bendable conveyor guide of the present invention, illustrating one preferred bead arrangement.

FIG. 3 is an exploded perspective view of a preferred embodiment of the bendable conveyor guide of the present invention, illustrating another preferred bead arrangement.

FIGS. 4A–4D are front, rear and side views of the channel member of the present invention.

FIGS. 6A–6B are front, side and top views of another preferred embodiment of the axle-positioning member of the present invention.

FIGS. 7A–7C are detail views of the notches in the axle-positioning member, illustrating the advantages of a preferred design.

FIG. 8 is a perspective view of a preferred bending apparatus of the present invention.

FIG. 9 is a side view of a preferred bending apparatus of the present invention, illustrating the advantages of the intersecting V design.

DETAILED DESCRIPTION OF THE PREFERRED EMBODIMENTS

Figure 1:
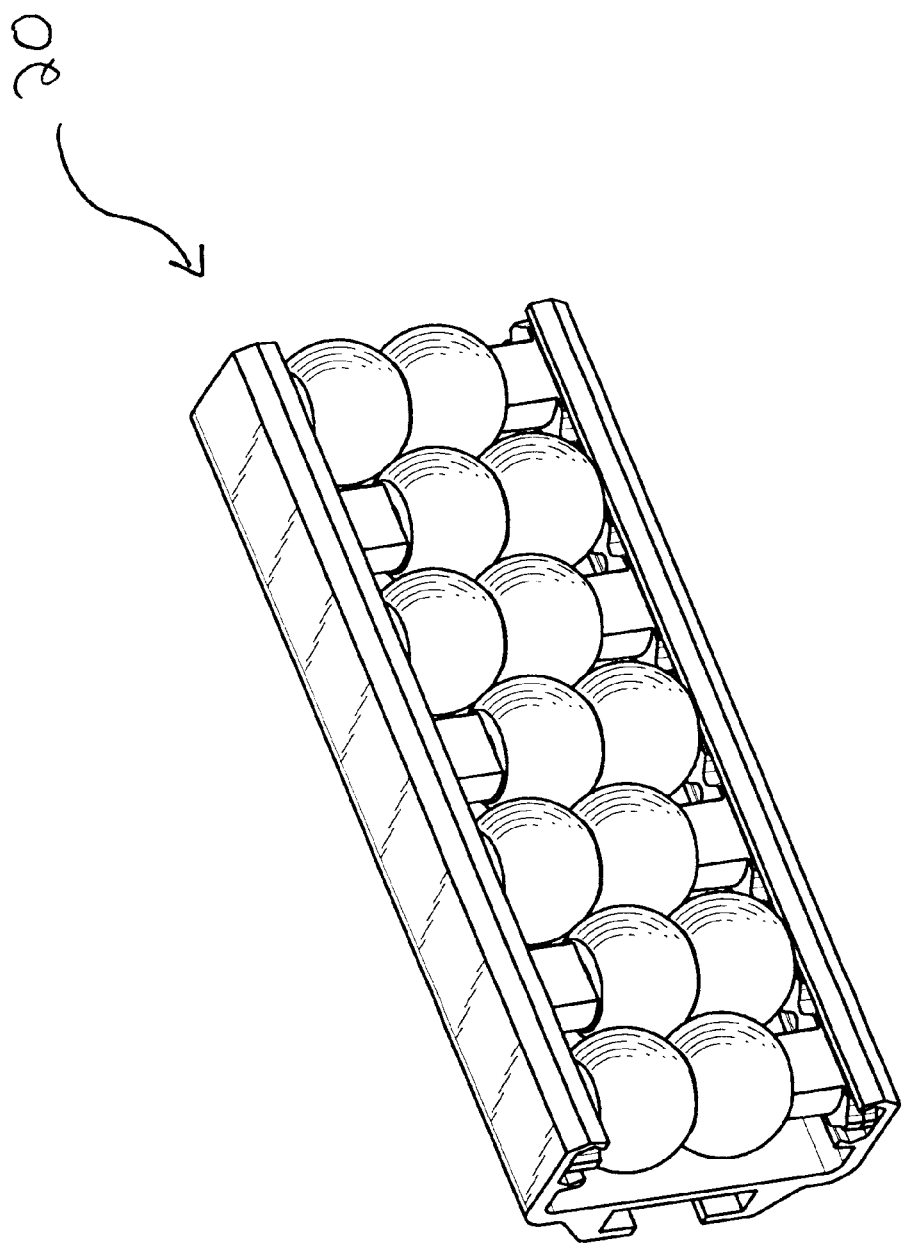
FIG. 1 is a perspective view of a preferred embodiment of the bendable conveyor guide of the present invention.

FIG. 1 illustrates a length of the fully assembled bendable conveyor guide 20 of the present invention, the individual components of which can be seen in FIGS. 2–6. The guide 20 includes an elongate structural support member 22, shown in detail in FIG. 4. This member 22 has a generally U-shaped cross-section, with two equal length extension arms 24 connected by a span 26. The support member 22 is adapted to be mounted on an appropriate surface alongside the conveyor by means of a channel 28 running along the length of the back surface 30 of the support member 22. The channel 28 is adapted to slidably engage a support surface, such as a strip of material, or a fastening member, such as a bolt head.

Each extension arm 24 preferably includes a generally U-shaped channel 32 in spaced relationship with the span 26, with the open sides of each channel 32 facing one another. Each channel 32 has oppositely disposed V-shaped grooves 34 that are adapted to slidably engage an axle-positioning member 36.

The axle-positioning member 36 shown in FIGS. 2, 3, 5A and 5B, 6A and 6B includes two oppositely disposed chain-like strips, each having a cross-section that is adapted to fit snugly within, and be retained by, the channel 32 of the extension arm 24. Each strip is divided into individual links 38 by uniformly spaced notches 40 along the length of the strip. Although the figures show a length of the axle-positioning member 36 having seven links, it will be understood by one of skill in the art that this member 36 and the support structure 22 in which it is housed could be manufactured in any of a variety of lengths having any number of axles 42.

In one preferred embodiment, each link 38 of one strip has an integrally formed elongate axle 42 extending from the center of the surface facing the other strip, and each link 38 of the other strip has a central socket 44 adapted to receive the end of an axle 42. Each axle 42 is generally cylindrical and adapted to receive at least one rotatable element 46, such as a bead or roller. In one preferred embodiment, the ends of each axle 42 include a chamfer 48 that facilitates insertion of the axle 42 end into the socket 44 by eliminating the need for all axles 42 to align exactly with all sockets 44 at the same time. The length of each axle 42 is variable depending on the number of rotatable elements 46 that are to be installed on each one.

The rotatable element 46 on each axle 42 may stand adjacent to the rotatable element 46 on the neighboring axles 42, or they may be offset so that they interlock. The interlocked configuration can be seen in FIGS. 2 and 3. An interlocked pattern is preferred, because it minimizes many of the gaps between elements 46 that tend to trap conveyed articles as they pass. If the elements 46 are to be offset, at least every other axle 42 must include one or more spacers 50 (FIG. 5B). In order to make assembly of the bendable conveyor guide 20 easier, spacers 50 may be formed integrally with some or all of the links 38 of each strip. In one preferred embodiment, every other link 38 has an integrally formed spacer 50 attached to the surface facing the other strip. Depending upon the rotatable element 46 arrangement desired, spacer 50 orientation may either be opposing, as in FIG. 3, or alternating, as in FIG. 2. Also, each strip may be formed with alternating axles 42 of different heights, as in FIGS. 5B and 6B, depending on how the spacers 50 and rotatable elements 46 are to be arranged.

It will be understood by one of skill in the art that it is not necessary to mold spacers 50 integrally with the links 38, but that doing so can make assembly of the entire device 20 easier and cheaper.

The axle-positioning member 36 can be made of any material suitable to withstand the anticipated loads upon the conveyor guide 20 and to have a low-friction compatibility with the rotatable elements 46, which are most often acetal or polypropylene or nylon. Metals provide greater strength than plastics, but plastics are easier to mold. Thus, if metals must be used, the economic advantages associated with integrally molding the spacers 50 and the links 38 may be lost. When acetal rotatable elements 46 are used and expected loads are relatively light, the member 36 may be manufactured from a material such as PBT which is preferred for reduced friction and structural strength.

FIGS. 7A–7C illustrate the design of the notches 40 between the links 38 of each strip. In FIG. 7A, the links 38 have square corners 52. These corners 52 interfere with the side walls 54 of the extension arm channel 32 when the entire assembly 20 is bent. The interference leads to two problems. First, it makes it difficult, if not impossible, to remove the axle-positioning members 36 from the channel 32.

Second, it places strain on the links 38 that can lead to upsetting the orientation of the axles 42. Because the rotatable members 46 are preferably in close proximity to one another, any upsetting of the axle 42 orientation can cause the rotatable members 46 to interfere with one another. This interference can compromise the ability of the guide 20 to provide a low-friction surface.

In FIG. 7B, the corners 56 have been rounded somewhat. The rounding lessens the interference somewhat, but it is still a potential problem. FIG. 7C illustrates a more preferred shape for the links 38. Links 38 of this shape largely eliminate interference with the channel 32 and greatly facilitate bending of the assembled guide 20. Theoretical radii as small as 5" can be accomplished without undesirable distortion of the channel 32 or the axle-positioning member 36.

Figure 5A:
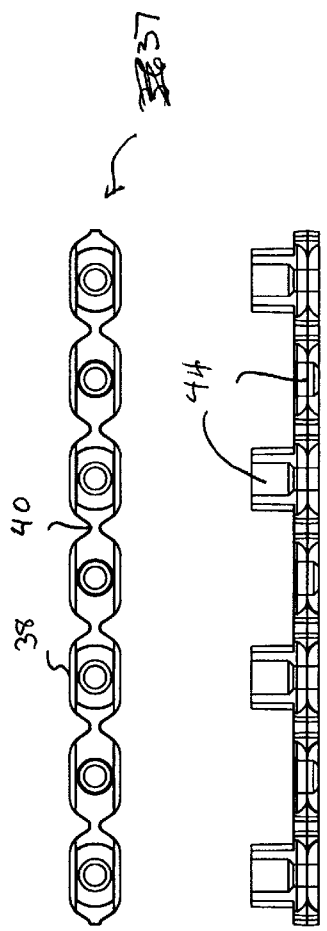
FIGS. 5A–5B are front, side and top views of a preferred embodiment of the axle-positioning member of the present invention.
Figure 5B:
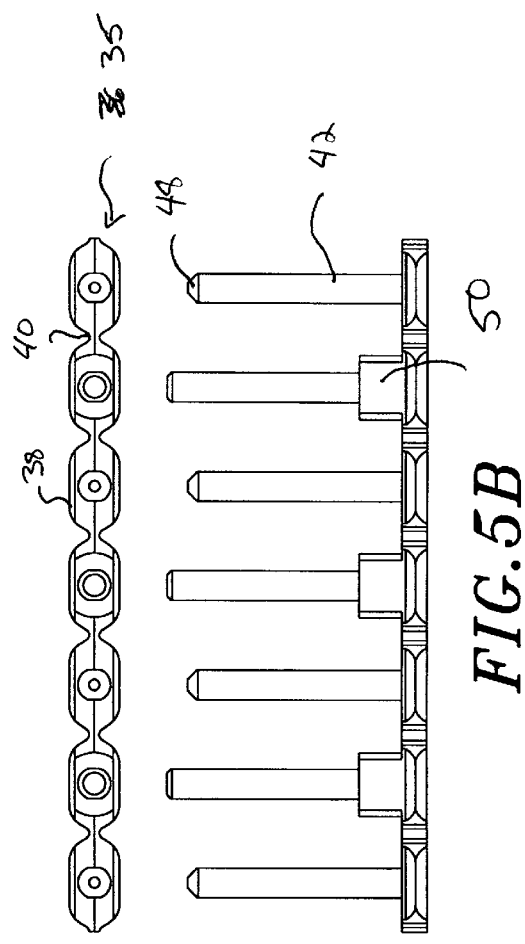

The process of making a preferred embodiment of the rolling guide 20 of the present invention is most easily understood with reference to FIGS. 5A–5B and 6A–6B. FIGS. 5A and 6A represent one strip of the axle-positioning member, while FIGS. 5B and 6B represent the second strip, which mates with the first strip to form the complete axle-positioning member.

The manufacturer begins with the strip 35 having integral axles 42, pictured in FIGS. 5B and 6B and referred to as the lower strip 35. It will be understood by one of skill in the art that the axle 42 lengths maybe varied in any manner to suit a particular application. They may be of uniform height, they may alternate in height, as in FIGS. 5B and 6B, or they may increase steadily in height from one end of the strip 35 to the other.

The lower strip 35 is positioned so that the axles 42 are oriented upward. The appropriate number of rotatable elements 46 are then placed upon the axles 42. As long as the axles 42 are oriented upward, gravity will hold the rotatable elements 46 in place.

Because the preferred arrangement of rotatable elements 46 is an interlocked pattern, as shown in FIGS. 2 and 3, the axles 42 must receive the rotatable elements 46 in a proper sequence to avoid any rotatable elements 46 blocking the passage of neighboring rotatable elements 46 as they move down the axle 42 to their resting positions. One such method is to first place one rotatable element 46 on each axle 42 having no spacer 50, and then place one rotatable element 46 on each axle 42 having a spacer 50, continuing with this pattern until all rotatable elements 46 have been installed.

Once all rotatable elements 46 have been installed, the upper strip 37 is placed atop the ends of the axles 42. To aid insertion of the axle 42 ends into the sockets 44, a preferred embodiment provides a chamfer 48 on the ends of the axles 42 and/or within the sockets 44. If a number of lengths of strips are to abut one another, the transitions between adjacent strips can be smoothed by offsetting the upper strip 37. In this way, no seam in the upper strip 37 would be directly opposite a seam in the lower strip 35. This arrangement can help to minimize gaps between axles 42.

Alternatively, the ends of each strip can be provided with mating apparatus so that they can be securely attached to one another. For example, each strip could include male and female connecting portions on opposite ends.

Once the upper strip 37 is in place, the entire assembly is inserted slidably into the channels 32 of the support member 22. If a bent length of guide 20 is desired, the assembled guide 20 is bent in a manner described below.

FIGS. 8 and 9 illustrate one preferred method of bending the assembled device 20 using a three-roll bender. The bender includes an adjustable roll 58 and two stationary rolls 60. The cross-sections of each roll 58, 60 are shaped as the mirror image the surface of the support member 22 that the roll engages, as illustrated in FIG. 9. The adjustable roll 58 thus includes a center flange 62 to fit between the legs of the channel 28 on the back surface 30 of the support member 22, and upper 64 and lower 66 tapered sections to match the corresponding tapered sections on the back surface 30 of the support member 22. The stationary roll 60 includes upper 68 and lower 70 V-shaped surfaces to engage the corresponding upper 72 and lower 74 V-shaped surfaces on the front surface of the support member 22. The V-shaped surfaces on the front surface of the support member 22 are illustrated in detail in FIG. 4C.

These unique cross-sections on both the support member 22 and the bending rolls 68, 70 are another aspect of the invention that facilitates bending. A common problem when bending rolling guides is distortion of the channel 32 in which the axle-positioning member 36 fits. Such distortion can cause axle 42 misalignment and the problems associated therewith. The V-shaped surfaces 72, 74 on the exterior of the channel 32 together with the corresponding V-shaped surfaces 68, 70 of the roller 60 largely eliminate channel 32 distortion. The axles 42 thus remain aligned within the bent guide 20. Of course, as will be understood by those of skill in the art, the surfaces 72, 74 on the member 22 may be of any configuration to align with the surfaces 68, 70 of the roller 60 to facilitate predictable and uniform bending.

The design of the rolling guide 20 of the present invention makes bending so easy that it may be performed by the guide 20 purchaser. Three-roll benders of the type used to bend these guides 20 are inexpensive to purchase or rent, and require little expertise to use properly. Thus, the guides 20 of the present invention can be manufactured in standard straight lengths, keeping costs down, and bent by the purchaser to suit a particular application. Alternatively, the purchaser can request the guides 20 to be bent by the manufacturer prior to delivery. Because the guides 20 are so easy to bend, bending by the manufacturer does not significantly raise the cost of the guides 20.

FIGS. 8 and 9 illustrate the proper configuration to form an interior bend. Most curved conveyor sections require a guide 20 on both the interior and exterior side of the curve. Thus, to form an exterior bend, the adjustable roll 58 in FIG. 8 is exchanged for one having the same cross-section as the stationary roll 60 in FIG. 8, and vice versa. The assembled guide 20 is passed through the rolls 58, 60 in the opposite orientation as in FIG. 8, so that the rotatable element 46 surface faces the new adjustable roll 58.

Figure 11:
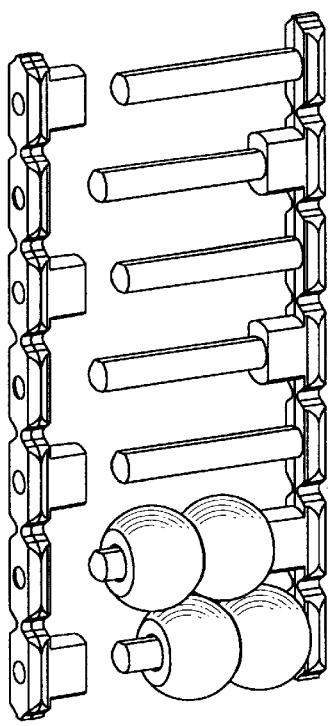
FIG. 11 is a perspective view of an alternative embodiment of the axle-positioning member of the present invention, illustrating the uni-directional, non-chamfered axle design.
Figure 10:
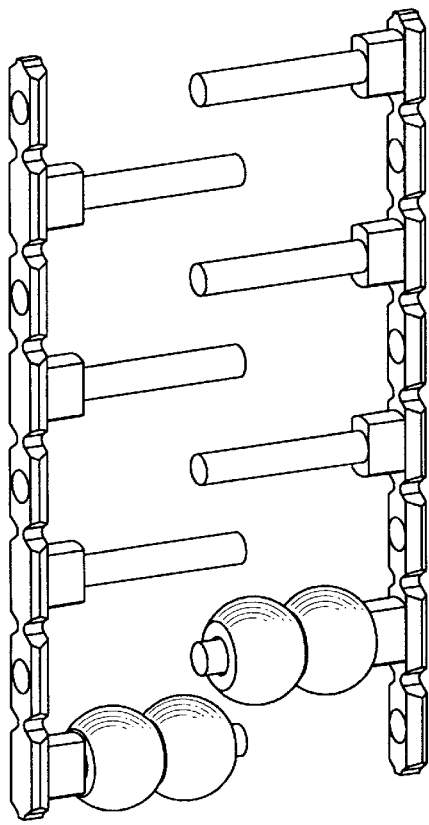
FIG. 10 is a perspective view of an alternative embodiment of the axle-positioning member of the present invention, illustrating the bi-directional, non-chamfered axle design.

FIGS. 10 and 11 illustrate two alternate embodiments of the axle-positioning member 36 of the present invention. In FIG. 10, the strips of the axle-positioning member 36 are formed such that every other link 38 has an integral axle 42. In FIG. 11, the ends of the axles 42 are formed without a chamfer.

Figure 12:
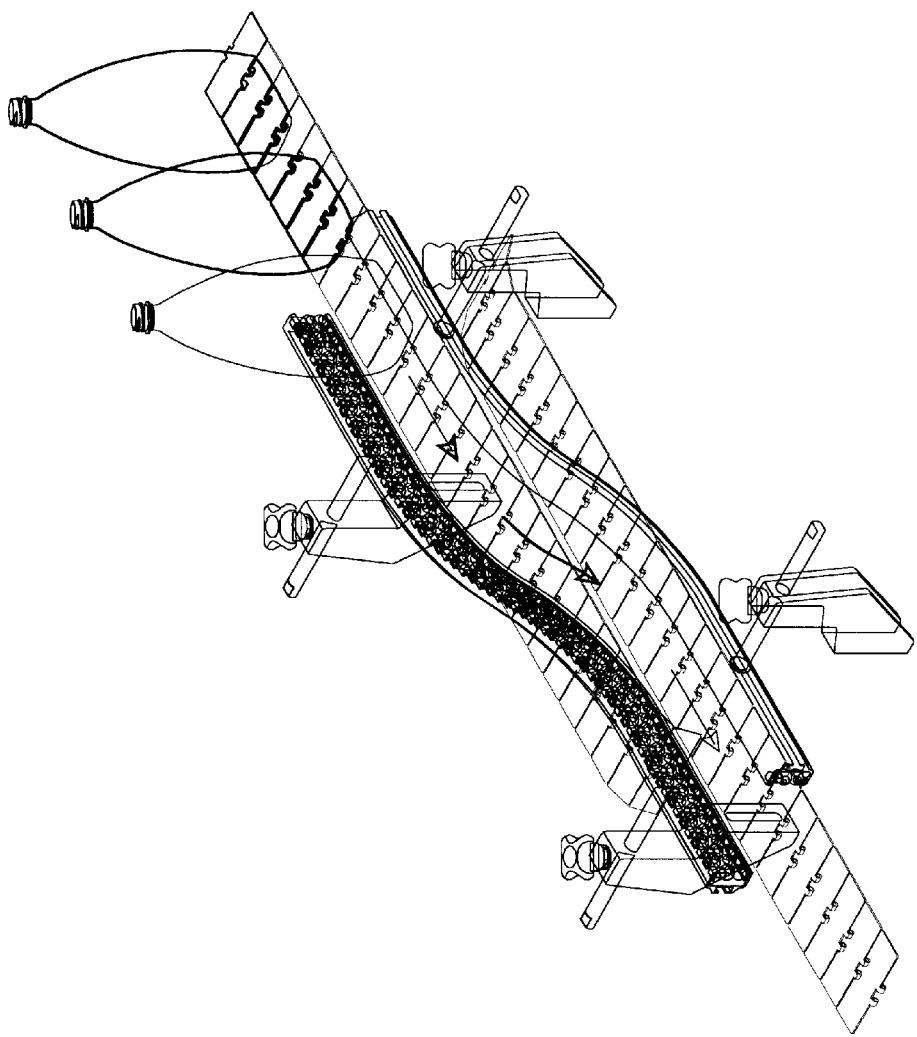
FIG. 12 is a perspective view of the bendable conveyor guide of the present invention disposed along a conveyor transfer.

FIG. 12 illustrates the bendable conveyor guide 20 of the present invention disposed in a transfer operation. Conveyed articles typically need to be transferred from one conveyor to another as they travel through an industrial installation. Rolling conveyor guides 20, such as the one disclosed here, are typically needed in these areas to prevent problems such as jamming or tipping of articles.

The above presents a description of the best mode contemplated for carrying out the present invention, and of the manner and process of making and using it, in such fall, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention.

What is claimed is:

1. An apparatus for guiding articles moving on a conveyor comprising:
   an elongated first axle-positioning member and an elongated second axle-positioning member spaced from the first axle-positioning member;
   one or more first axles extending between the axle-positioning members with one end of each of said axles being molded integrally as one piece with said first axle-positioning member and the other end of each of said axles being received in a socket formed in the second axle-positioning member; and
   one or more rotatable elements mounted on each of said axles to be engaged by articles moving on a conveyor.

2. The apparatus of claim 1, wherein said second axle-positioning member has one or more second axles having one end formed integral with the second axle-positioning member and with the other end of the second axles extending into sockets formed in the first axle-positioning member, and one or more rotatable elements mounted on the second axles.

3. The apparatus of claim 2, wherein the first axles fit between the second axles.

4. The apparatus of claim 1, including spacers positioned on said axles so that rotatable elements on one axle are vertically offset with respect to the rotatable elements on adjacent axles.

5. The apparatus of claim 4, wherein the spacers are formed integral with at least one of said axle-positioning members.

6. The apparatus of claim 1, wherein said axle other ends or said sockets are tapered to facilitate the entry of the axles into the sockets.

7. The apparatus of claim 1, including first and second guide rails having channels to receive said axle-positioning members in a manner to maintain the axles within the sockets.

8. The apparatus of claim 7, wherein said rails are rigid, such that they will not bend under loads applied during normal use, but said rails are also bendable, so that they may be bent into a curved configuration prior to use.

9. The apparatus of claim 8, wherein said axle-positioning members have notched edges which facilitate curving of the axle-positioning members.

10. The apparatus of claim 9, wherein said first and second guide rails have a surface that includes a V-shaped protrusion along the outside of the rails.

11. The apparatus of claim 8, wherein said axle-positioning members are flexible about an axis parallel to said axles.

12. The apparatus of claim 1, wherein said rails are rigid, such that they will not bend under loads applied during normal use, but said rails are also bendable, so that they may be bent into a curved configuration prior to use.

13. The apparatus of claim 12, wherein said axle-positioning members have notched edges which facilitate curving of the axle-positioning members.

14. The apparatus of claim 12, wherein said axle-positioning members are flexible about an axis parallel to said axles.

15. An apparatus for guiding articles moving on a conveyor comprising:
   an elongated first axle-positioning member and an elongated second axle-positioning member spaced from the first axle-positioning member;
   one or more spacers, with each of said spacers being molded integrally as one piece with one of said axle-positioning members;
   one or more sockets formed in each of the axle-positioning members;
   one or more axles extending between the axle-positioning members; and
   one or more rotatable elements mounted on each of said axles to be engaged by articles moving on a conveyor.

16. The apparatus of claim 13, wherein said axles are tapered at either or both of a first end and a second end, or said sockets are tapered to facilitate the entry of the axles into the sockets.

17. The apparatus of claim 15, including first and second guide rails having channels to receive said axle-positioning members in a manner to maintain the axles within the sockets.

18. The apparatus of claim 17, wherein said rails are rigid such that they will not bend under loads applied during normal use, but said rails are also bendable, so that they may be bent into a curved configuration prior to use.

19. The apparatus of claim 18, wherein said axle-positioning members have notched edges which facilitate curving of the axle-positioning members.

20. The apparatus of claim 19, wherein said first and second guide rails have a surface that includes a V-shaped protrusion along the outside of the rails.

21. The apparatus of claim 18, wherein said axle-positioning members are flexible about an axis parallel to said axles.

22. A method of assembling a rolling conveyor guide comprising the steps of:
   providing an axle-positioning member having integral formed axles, wherein the axles are oriented upward;
   placing an appropriate number of rotatable elements upon the axles;
   securing a second axle-positioning member to the free ends of the axles; and
   slidably inserting the assembled axle-positioning members and rotatable elements into a support structure, wherein the support structure has spaced channels adapted to receive the axle-positioning members.

23. A method of assembling a rolling conveyor guide comprising the steps of:
   providing an axle-positioning member having integral formed axles, wherein the axles are oriented upward;
   placing an appropriate number of rotatable elements upon the axles;

securing a second axle-positioning member to the free ends of the axles; and slidably inserting the assembled axle-positioning members and rotatable elements into a support structure, wherein the support structure has spaced channels adapted to receive the axle-positioning members; and wherein the second axle-positioning member is horizontally offset from the first axle-positioning member, such that the ends of the second axle-positioning member do not directly oppose the ends of the first axle-positioning member.

24. The method of claim 22, further comprising the step of bending the support structure and axle-positioning members.

25. An apparatus for guiding articles moving on a conveyor comprising:

a pair of spaced elongated axle-positioning members having notched edges;

a plurality of axles extending between said axle-positioning members; and one or more rotatable elements mounted on each of said axles, said notched edges of said axle-positioning members being configured to locate one notch on each edge between each axle, the notches facilitating curving of the axle-positioning members about ail axis that is perpendicular to their longitudinal axis.

26. The apparatus of claim 25, including a pair of spaced, elongated rails each having a channel for respectively receiving one of the axle-positioning members.

27. The apparatus of claim 26, wherein said rails have a section that includes a V-shaped protrusion along the outside of the rails.

* * * * *